United States Patent
Hassett et al.

(10) Patent No.: US 8,198,770 B2
(45) Date of Patent: Jun. 12, 2012

(54) HEAT PIPE BEARING COOLER SYSTEMS AND METHODS

(75) Inventors: Timothy Hassett, Santa Rosa, CA (US); Mark Hodowanec, Leesburg, VA (US)

(73) Assignee: HPEV, Inc., Wesley Chapel, FL (US)

( * ) Notice: Subject to any disclaimer, the term of this patent is extended or adjusted under 35 U.S.C. 154(b) by 492 days.

(21) Appl. No.: 12/418,162

(22) Filed: Apr. 3, 2009

(65) Prior Publication Data

US 2009/0250197 A1  Oct. 8, 2009

Related U.S. Application Data

(60) Provisional application No. 61/042,538, filed on Apr. 4, 2008.

(51) Int. Cl.
*H02K 5/16* (2006.01)
(52) U.S. Cl. ............... 310/90; 310/58; 310/64
(58) Field of Classification Search ........... 310/90, 310/52, 54, 57, 58, 64; 384/321
See application file for complete search history.

(56) References Cited

U.S. PATENT DOCUMENTS

| | | | | |
|---|---|---|---|---|
| 3,030,529 A | * | 4/1962 | Jaeschke et al. | 310/53 |
| 3,191,079 A | * | 6/1965 | Gitzendanner | 310/55 |
| RE26,776 E | * | 1/1970 | Anderson et al. | 310/57 |
| 3,621,908 A | * | 11/1971 | Pravda | 165/86 |
| 3,801,843 A | | 4/1974 | Corman et al. | |
| 4,270,064 A | | 5/1981 | Glandorf et al. | |
| 4,322,646 A | | 3/1982 | Persson | |
| 5,220,978 A | | 6/1993 | McMaster | |
| 7,102,267 B2 | * | 9/2006 | Gromoll et al. | 310/260 |
| 2006/0017335 A1 | | 1/2006 | Matin et al. | |

* cited by examiner

*Primary Examiner* — Dang Le
(74) *Attorney, Agent, or Firm* — Polster, Lieder, Woodruff & Lucchesi, L.C.

(57) ABSTRACT

A method of cooling shaft bearings of a high speed rotating machine is provided. In various embodiments, the method includes utilizing a primary cooling circuit of the machine that is structured and operable to cool a drive package of the machine to cool condenser ends of each of a plurality of heat pipes absent an auxiliary cooling system structured for cooling the heat pipe condenser ends. Each heat pipe including a respective evaporator end disposed proximate the shaft bearings to absorb heat generated by the bearings during operation of the machine.

24 Claims, 9 Drawing Sheets

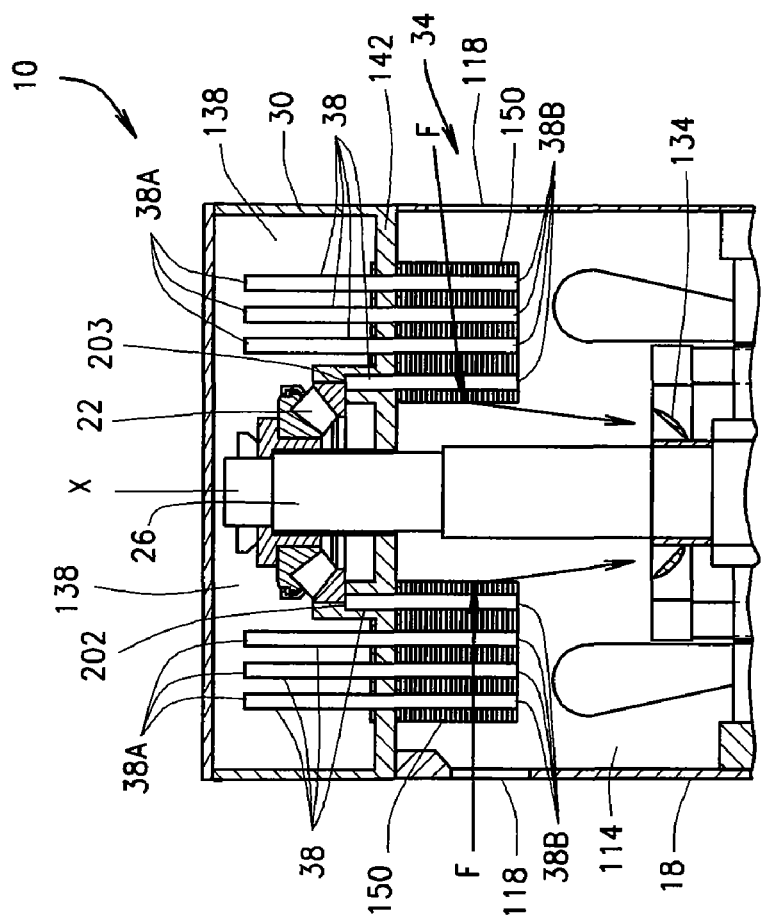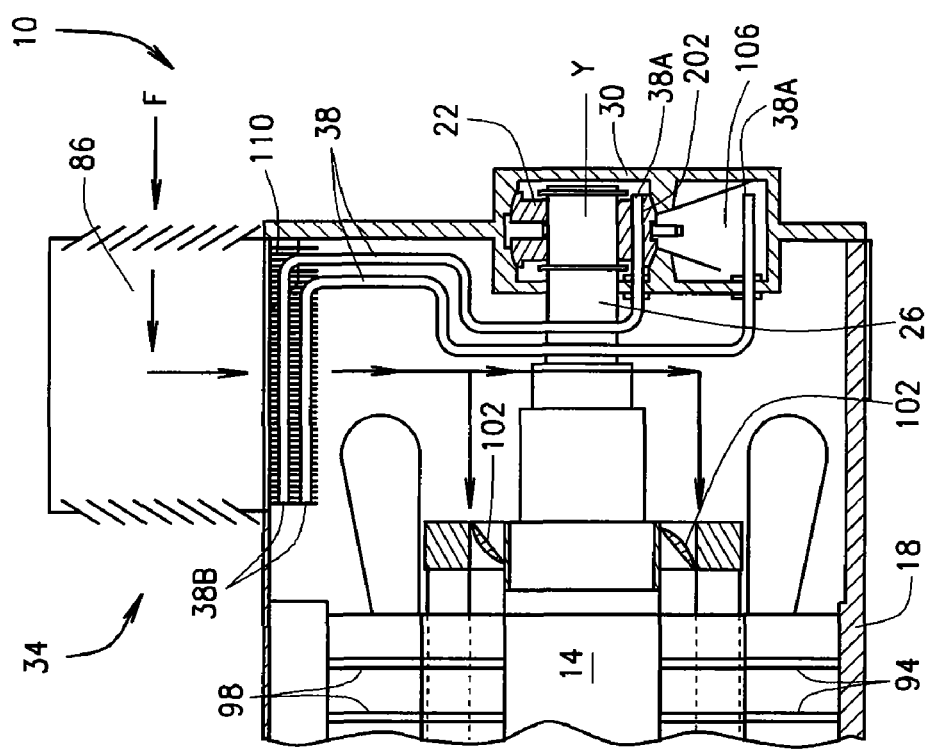

HEAT PIPE BEARING COOLER SYSTEMS AND METHODS

CROSS-REFERENCE TO RELATED APPLICATIONS

This application claims the benefit of U.S. Provisional Application No. 61/042,538, filed on Apr. 4, 2008.

Additionally, the present application is related in general subject matter to the following applications, each of which is hereby incorporated by reference, in their entirety, into the present application: U.S. application Ser. No. 11/765,140, filed Jun. 19, 2007; and U.S. application Ser. No. 12/352,301, filed Jan. 12, 2009.

FIELD

The present teachings relate to systems and method for cooling the bearings of high speed rotating equipment such as cooled turbo machinery.

BACKGROUND

The statements in this section merely provide background information related to the present disclosure and may not constitute prior art.

Large industrial high speed rotating equipment such as cooled turbo machinery with high bearing loads, e.g., steam turbines, centrifugal pumps, motors, generators, centrifugal compressors, etc., contain shaft bearings which generate significant heat during operation of the machinery. This is true of machines that utilize antifriction bearings (such as deep groove ball bearings, cylindrical roller bearings, spherical thrust bearings, etc.) or journal bearings (such as plain bearings, lemon bore bearings, tilting pad bearings, etc.).

Particularly, such machinery is typically operated at high rotating speeds, i.e., high RPMs, such that the large bearings utilized therein are unable to 'self-cool'. Accordingly, separate auxiliary cooling systems designed to cool the bearings are often provided to prevent the bearings from overheating and failing. That is, auxiliary cooling systems that are separate and independent from cooling systems of the machine that are designed to cool the electrical package of the machine (e.g., the rotor and stator, in the case of electrical machines) are provided to cool the bearings. Such auxiliary cooling systems are known to include circulated liquid medium cooling systems such as water-cooled bearing systems where external water is piped through cooling tubes which cools the bearing lubricating oil, and flood lubrication systems where the bearing lubricating oil itself is pumped out, cooled, and pumped back into the bearing.

Although effective, these auxiliary cooling systems required considerable additional support devices and apparatuses, such as pumps, piping, heat exchangers, fans, etc., and other additional structures, which increase the fabrication and operating costs of such rotating equipment and machinery. Furthermore, due to the lesser reliability and integrity of such auxiliary systems, relative to the rotating equipment and turbo machinery they are designed to cool, such auxiliary systems consequently reduce reliability of the respective rotating equipment and turbo machinery.

SUMMARY

The present disclosure provides systems and methods for cooling shaft bearings of a high speed rotating machine.

In various embodiments, a method is provided that includes utilizing a primary cooling circuit of the machine that is structured and operable to cool a drive package of the machine to cool condenser ends of each of a plurality of heat pipes absent an auxiliary cooling system structured for cooling the heat pipe condenser ends. Each heat pipe including a respective evaporator end disposed proximate the shaft bearings to absorb heat generated by the bearings during operation of the machine.

In various other embodiments, a method is provided that includes disposing an evaporator end of a plurality of heat pipes at a location proximate shaft bearings of the high speed rotating machine to absorb heat generated by the bearings during operation of the machine. In such embodiments, the method additionally includes disposing a respective condenser end of each heat pipe within a primary cooling circuit of the machine that is structured and operable to cool a drive package of the machine. Therefore, during operation of the machine the primary cooling circuit will cool the condenser ends of the heat pipes absent an auxiliary cooling system structured for cooling the heat pipe condenser ends.

In still other embodiments, the system is provided that includes a main housing frame and a drive package rotationally disposed within the frame via a shaft mounted within at least one shaft bearing mounted within a respective bearing housing coupled to the frame. In such embodiments, the system additionally includes a drive package cooling system structured and operable to provide a primary cooling circuit designed to cool the drive package during operation of the machine and a plurality of heat pipes. Each heat pipe includes an evaporator end and an opposing condenser end, wherein each heat pipe evaporator end is disposed at a location proximate the at least one shaft bearing to absorb heat generated by the at least one bearing during operation of the machine. Furthermore, each heat pipe condenser end is disposed within the primary cooling circuit of the machine such that during operation of the machine the primary cooling circuit will cool the condenser ends of the heat pipes absent an auxiliary cooling system structured for cooling the heat pipe condenser ends.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 6A is a cross-sectional partial view of an exemplary high speed rotating machine, such as that shown in FIG. 3A having an evaporator end of a heat pipe disposed within a bearing journal, in accordance with various embodiments of the present disclosure.

FIG. 6B is a cross-sectional partial view of an exemplary high speed rotating machine, such as that shown in FIG. 4 having an evaporator end of a heat pipe integrally disposed within the structure of a bearing housing in close proximity to the respective shaft bearing, in accordance with various embodiments of the present disclosure.

Corresponding reference numerals indicate corresponding parts throughout the several views of drawings.

DETAILED DESCRIPTION

Figure 1:
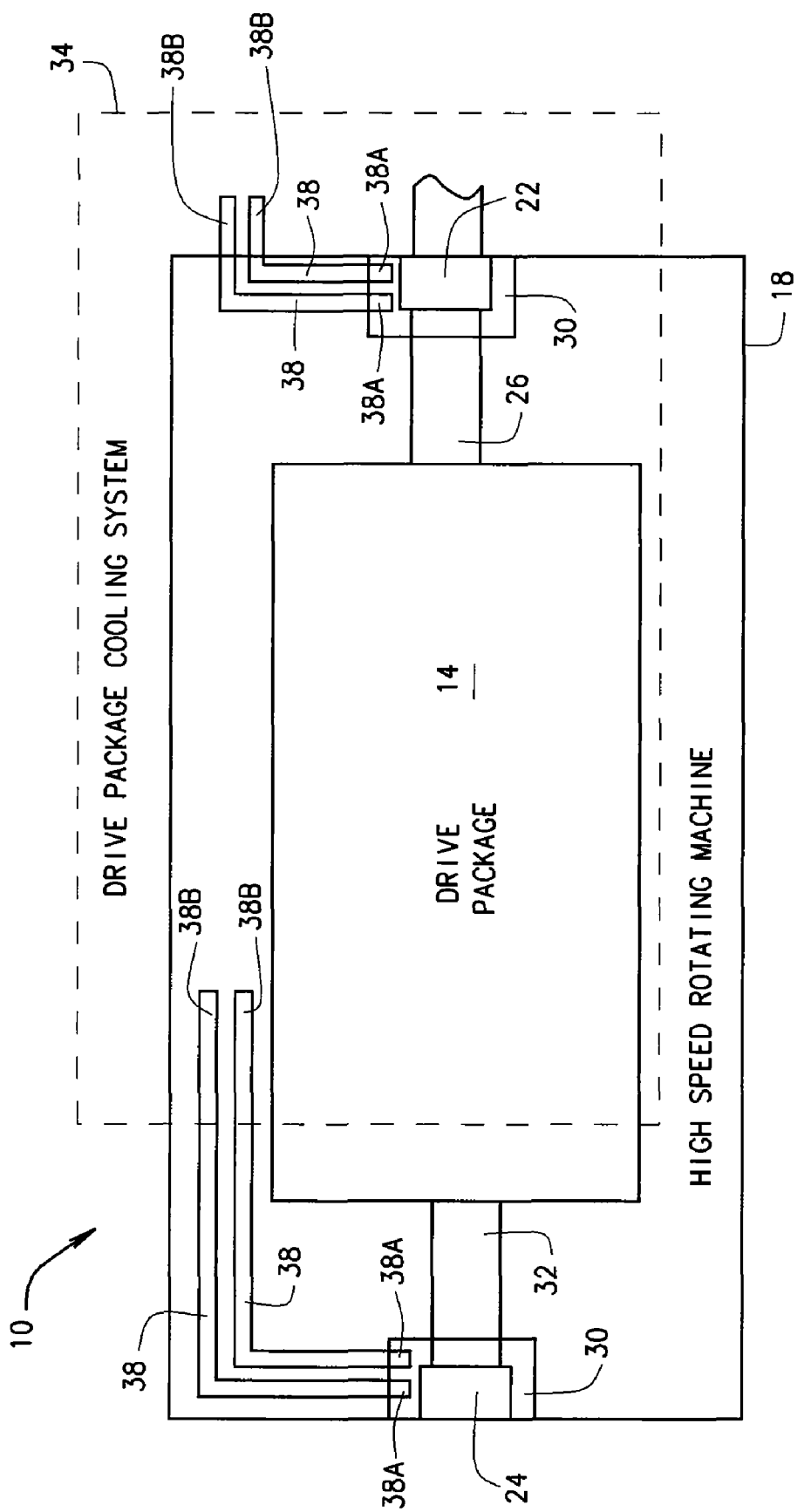
FIG. 1 is block diagram of a high speed rotating machine that is structured and operable to utilize a primary cooling circuit of the machine to cool shaft bearings of the machine without implementing a separate auxiliary bearing cooling system structured to cool the shaft bearings, in accordance with various embodiments of the present disclosure.

The following description is merely exemplary in nature and is in no way intended to limit the present teachings, application, or uses. Throughout this specification, like reference numerals will be used to refer to like elements.

FIG. 1 is an illustration of an exemplary high speed rotating machine 10, such as an electric motor, a cooled turbomachine, a steam turbine, a centrifugal pump, a generator, a centrifugal compressor, a gearbox, or any other rotating machine that includes large high speed bearings. For example, in various embodiments, the high speed rotating machine 10 can be a cooled turbomachine that includes a machine drive package 14, e.g., an electrical package of a motor including a stator and rotor assembly or a drive train of a gearbox including a plurality of gears, rotationally mounted within a main housing frame 18 via a pair of shaft bearings 22 and 24, wherein at least one of the shaft bearings 22 and/or 24 needs to be cooled during operation of the machine 10. More particularly, the drive package 14 is rotationally mounted within the frame 18 via a shaft 26 disposed within the shaft bearings 22 and 24 and the shaft bearings 22 and 24 are each mounted within a respective bearing housing 30 and 32. The shaft bearings 22 and 24 can be any bearings suitable for use in high speed rotating machinery, for example, in various embodiments, either one, or both, of the shaft bearings 22 and 24 can be a thrust bearing, a fluid-film bearing, or any other suitable high speed bearing.

The machine 10 additionally includes a drive package cooling system 34 structured and operable to provide a primary cooling circuit, e.g., an air flow or liquid medium circulation path, designed to cool the drive package 14, e.g., a motor electrical package or a gearbox drive train, during operation of the machine 10. The machine 10 further includes a plurality of heat pipes 38 disposed within the machine 10 to cool at least one of the shaft bearings 22 and/or 24 during operation of the machine 10.

Moreover, in accordance with various embodiments, the machine 10 is structured and operable, as described further below, to utilize the primary cooling circuit generated by the drive package cooling system 34 to additionally cool the heat pipes 38 during operation of the machine 10, without the need for, or use of, a separate, independent auxiliary secondary cooling system, or means, that is primarily designed to cool the heat pipes 38.

As described above, the machine 10 includes a plurality of heat pipes 38. The heat pipes 38 are disposed, i.e., located, placed and oriented, within the machine 10 such that the heat pipes 38 remove heat from, i.e., cool, at least one of the shaft bearings 22 and/or 24 during operation of the machine 10. Each heat pipe 38 includes an evaporator end 38A and an opposing condenser end 38B. Each evaporator end 38A is disposed within the machine 10 at a location proximate at least one of the shaft bearings 22 and/or 24 such that, during operation of the machine 10, the heat generated by at least one of the shaft bearings 22 and/or 24 is absorbed by the evaporator ends 38A of the respective heat pipe(s) 38. The condenser ends 38B of each heat pipe 38 are disposed within the primary cooling circuit of the machine 10 such that during operation of the machine 10 the primary cooling circuit will cool the condenser ends 38B of the heat pipes 38.

More specifically, the condenser ends 38B of each heat pipe 38 are disposed within, and cooled by, the primary cooling circuit, generated by the drive package cooling system 34, absent an auxiliary cooling system that is structured and operable for cooling the heat pipe condenser ends 38B. That is, the machine 10 does not include any auxiliary, extra, additional or supplemental cooling system designed, structured and implemented to generate or provide a secondary cooling circuit for cooling the heat pipe condenser ends 38B. Rather, the machine 10 is structured and operable to cool the heat pipe ends 38B utilizing the primary cooling circuit, wherein the primary cooling circuit is provided by the drive package cooling system 34 that is designed, structured and implemented for the purpose of cooling the drive package 14.

Thus, heat is removed from the shaft bearing(s) 22 and/or 24, thereby cooling the shaft bearing(s) 22 and/or 24, utilizing the heat pipes 38 having the evaporator ends 38A disposed proximate the shaft bearing(s) 22 and/or 24 and the condenser ends 38B disposed within the primary cooling circuit provided by the drive package cooling system 34. Accordingly, the heat pipe condenser ends 38B, and hence the shaft bearing(s) 22 and/or 24, are cooled during operation of the machine 10 utilizing the primary cooling circuit provided by the drive package cooling system 34, absent any auxiliary cooling system that is structured and operable for the particular purpose of cooling the heat pipe condenser ends 38B.

Figure 2:
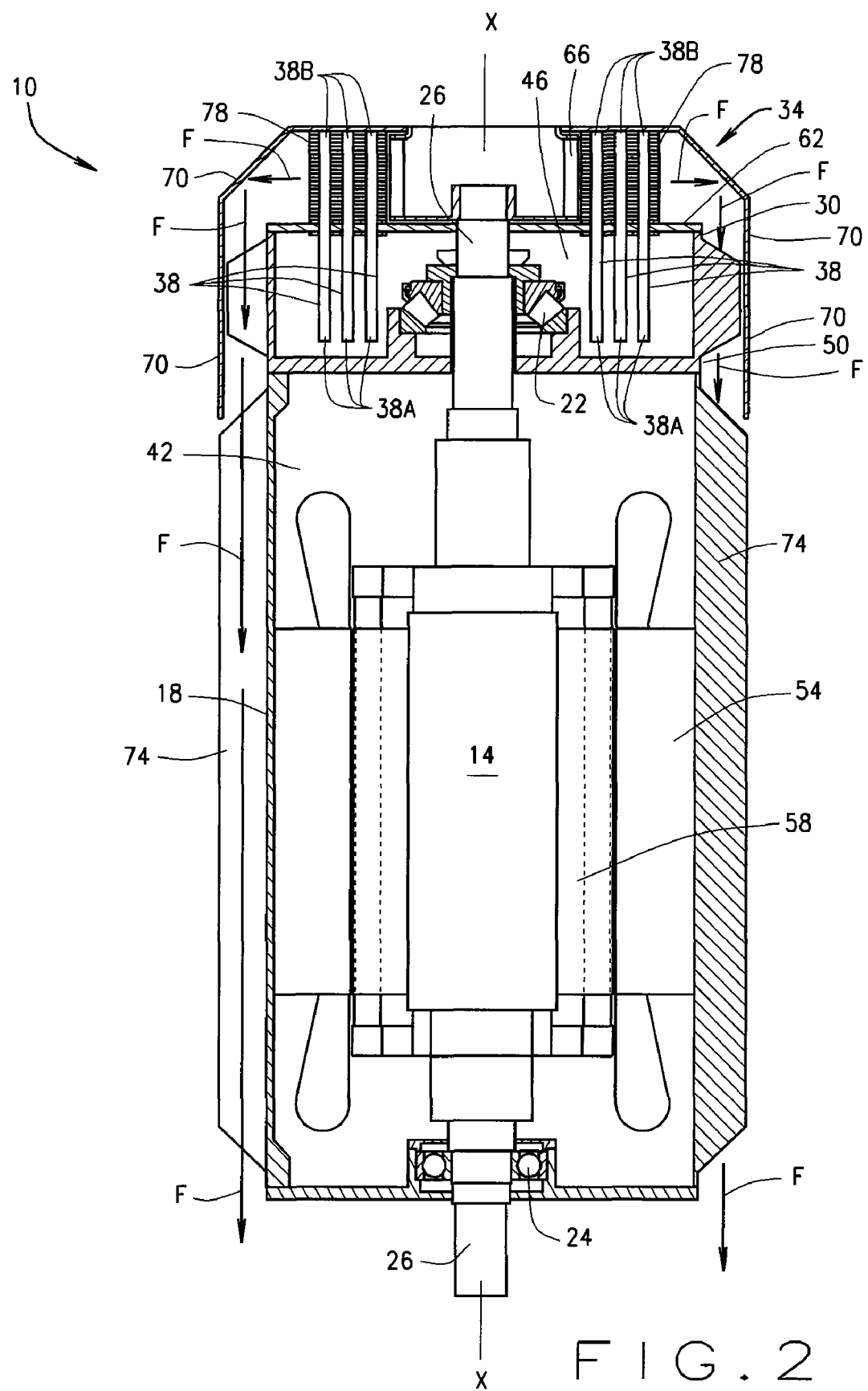
FIG. 2 is a cross-sectional side view of an exemplary high speed rotating machine, such as that shown in FIG. 1, wherein the high speed rotating machine comprises a totally enclosed fan cooled (TEFC) vertical motor, in accordance with various embodiments of the present disclosure.

Referring now to FIG. 2, although, as described above, the machine 10 can be any high speed rotating machine having high speed bearings 22 and 24, e.g., an electric motor, a cooled turbomachine, a steam turbine, a centrifugal pump, a generator, a centrifugal compressor, a gearbox etc., and remain within the scope of the present disclosure, for simplicity and clarity, the machine 10 will be exemplarily described herein with reference to motors, wherein the drive package 14 comprises an electrical package and the drive package cooling system comprises an electrical package cooling system.

For example, in various embodiments, the machine 10 can be a high speed totally enclosed fan cooled (TEFC) vertical motor including a closed electrical package chamber 42 that totally encloses the electrical package 14. That is, there is no free exchange of air from an ambient exterior environment of the TEFC vertical motor 10 with an interior space of the electrical package chamber 42. The TEFC vertical motor 10 additionally includes shaft bearings 22 and 24, wherein bearing 22 comprises an upper antifriction shaft thrust bearing or a fluid-film bearing that requires cooling during operation of the TEFC vertical motor 10, and bearing 24 is a lower guide bearing that does not require cooling during operation of the machine 10. To cool and lubricate the bearing 22, the bearing 22 is disposed within an oil chamber 46 of the bearing housing 30 that is located at a top end of the main housing frame 18.

The bearing housing 30 and oil chamber 46 are separated from the electrical package chamber 42 by a bearing housing plate 50. The electrical package 14 generally includes a stator 54 fixedly mounted within the electrical package chamber 42 and a rotor 58 fixedly mounted to the shaft 26. During operation of the TEFC vertical motor 10 the shaft 26 and rotor 58 rotate about an axis X of the shaft 26, relative to the fixed stator 54. Additionally, the electrical package cooling system 34 is disposed adjacent the bearing housing 30 and separated from the oil chamber 46 via a bearing housing cover 62. In such embodiments, the electrical package cooling system 34 can include a cooling fan 66 that generates an air flow F that constitutes the primary cooling circuit of the TEFC vertical motor 10 provided for cooling the electrical package 14 within the electrical package chamber 42.

More particularly, the cooling fan 66 is mounted to an upper end of the shaft 26 such that as the shaft 26 and rotor 58 rotate about the axis X during operation of the motor 10, the cooling fan 66 also rotates about the axis X generating the air flow F orthogonal to the axis X. A fan housing 70, of the electrical package cooling system 34 directs the air flow F substantially parallel to the axis X along an exterior surface of the TEFC vertical motor frame 18, thereby removing heat from TEFC vertical motor frame 18 to cool the electrical package 14. Thus, in such embodiments, the primary cooling circuit comprises the air flow F generated orthogonally to the axis X by the cooling fan 66 and directed along the longitudinal length of the TEFC vertical motor exterior surface by the fan housing 70. In various implementations, the exterior surface of the TEFC vertical motor frame 18 includes a plurality of heat exchanging fins 74 that channel the primary cooling circuit, i.e., the air flow F, along the TEFC vertical motor frame outer surface, thereby increasing the removal of heat from the TEFC vertical motor frame 18 and increasing the cooling provided to the electrical package 14. As described above, the primary cooling circuit, i.e., the air flow F, is generated by the electrical package cooling system 34, i.e., the cooling fan 66 and fan housing 70, primarily to cool the electrical package 14.

As also described above, during operation of the TEFC vertical motor 10 the shaft 26 and rotor 58 rotate about an axis X. Consequently, the rotation of the shaft 26 and rotor 58 cause the bearing 22 to rotate about the axis X at a high rate of speed, thereby generating a significant amount of heat that will damage the bearing 22, if such heat is not adequately removed. To remove such heat from the bearing 22, i.e., to cool the bearing 22, the evaporator ends 38A of the heat pipes 38 are disposed within the oil chamber 46, proximate the bearing 22, and the condenser ends 38B of the heat pipes 38 are disposed within the primary cooling circuit, i.e., the air flow F. Therefore, prior to directing air flow F along the exterior of the TEFC vertical motor housing 18, the air flow F of the primary cooling circuit passes over the heat pipe condenser ends 38B. As the air flow F passes over the heat pipe condenser ends 38B, the air flow F removes heat from, i.e., cools, the heat pipe condenser ends 38B, thereby cooling the heat pipe evaporator ends 38A and subsequently, cooling the oil within the oil chamber 46 and hence, the bearing 22.

Thus, during operation of the TEFC vertical motor 10 the heat pipe condenser ends 38B, and subsequently the bearing 22, are cooled utilizing the primary cooling circuit. And, more specifically, the heat pipe condenser ends 38B and subsequently the bearing 22, are cooled without, i.e., absent, any separate, independent auxiliary bearing cooling system, or means, that is primarily designed to cool the heat pipe condenser ends 38B. That is, the TEFC vertical motor 10 does not include any auxiliary, extra, additional or supplemental cooling system designed, structured and implemented to generate or provide a secondary cooling circuit for cooling the heat pipe condenser ends 38B. But rather, the TEFC vertical motor 10 is structured and operable to cool the heat pipe condenser ends 38B utilizing the primary cooling circuit that is designed, structured and implemented for the primary purpose of cooling the electrical package 14.

In various embodiments, the electrical package cooling system 34 of the TEFC vertical motor 10 further includes at least one heat exchanger 78 having the heat pipe condenser ends 38B disposed therein. More specifically, the heat exchanger(s) 78 is/are disposed within the primary cooling circuit such that the air flow F is directed across the heat exchanger(s) 78 prior to being directed along the exterior of the TEFC vertical motor frame 18. The heat exchanger(s) 78 increase(s) the removal of heat from the heat pipe condenser ends 38B and thereby increase the removal of heat from the oil in the oil chamber 46 and hence, the bearing 22.

Figure 3A:
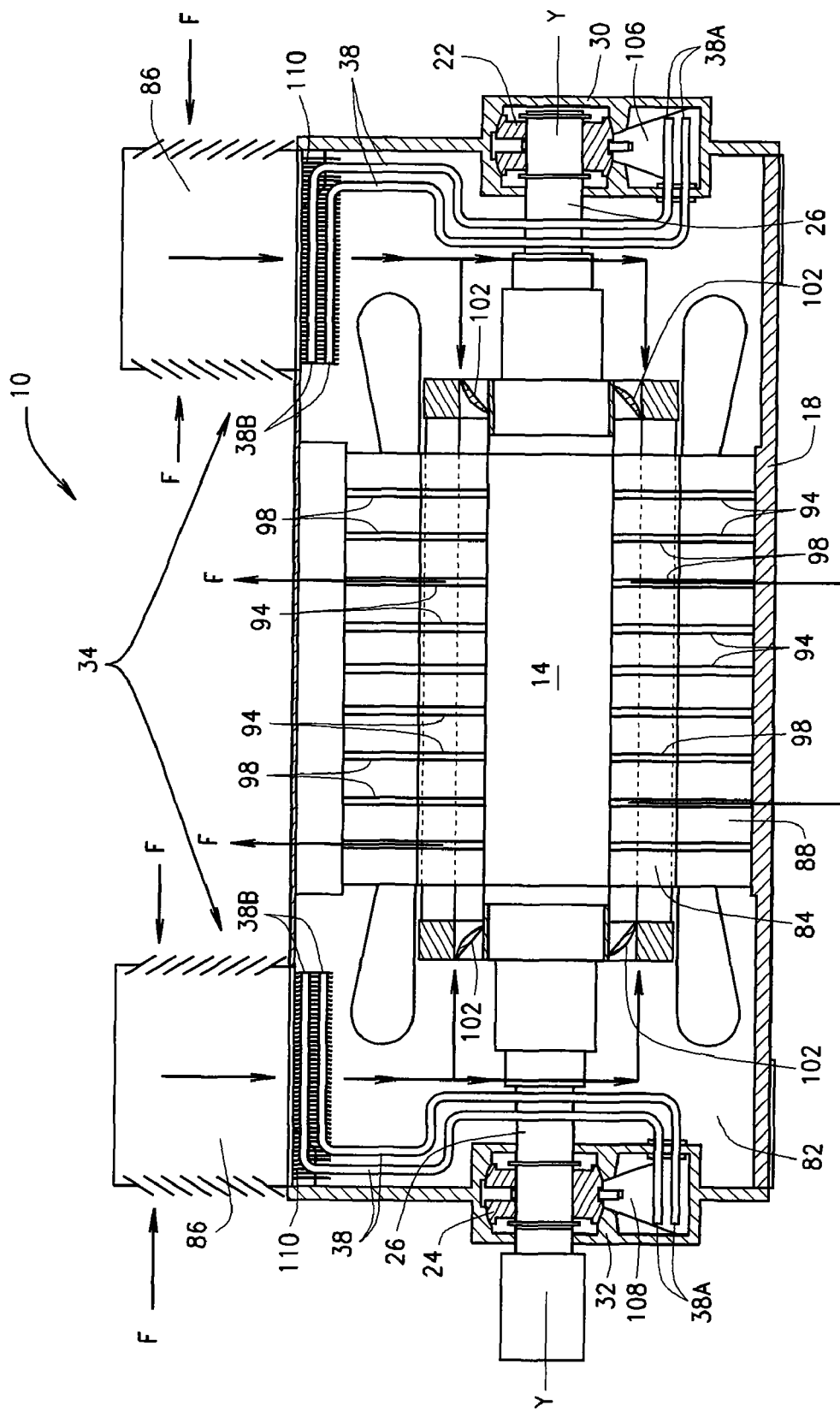
FIG. 3A is a cross-sectional view of an exemplary high speed rotating machine, such as that shown in FIG. 1, wherein the high speed rotating machine comprises an open horizontal motor, in accordance with various embodiments of the present disclosure.
Figure 3B:
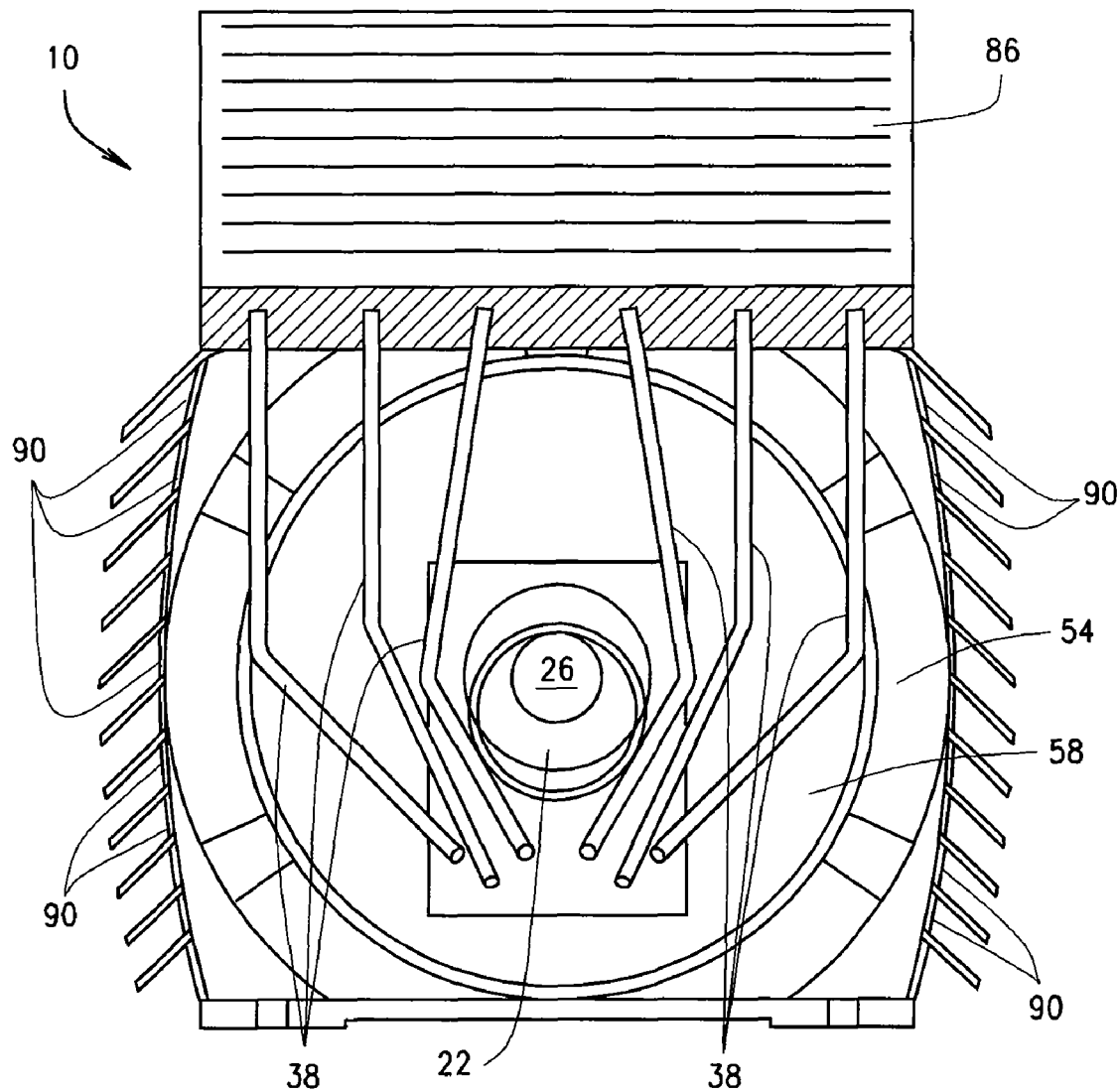
FIG. 3B is a cross-sectional front view of the exemplary high speed rotating machine shown in FIG. 3, in accordance with various embodiments of the present disclosure.

Referring now to FIGS. 3A and 3B, in various exemplary embodiments, the machine 10 can be an open horizontal motor 10 including an open electrical package chamber 82 that encloses the electrical package 14, but is open to ambient air. That is, the open horizontal motor 10 includes at least one air intake port 86 that allows air from the ambient exterior environment to be drawn into the open electrical package chamber 82, and at least one air exhaust port 90 that allows the air drawn into the open electrical package chamber to be exhausted back into the ambient exterior environment. More particularly, during operation of the open horizontal motor 10, the rotation of a rotor 84 of the electrical package 14 draws ambient air into the open electrical package chamber 82, via the air intake port(s) 86 (shown as air flow F), circulates the air flow F around the electrical package 14, vents the air through a plurality of radial rotor vents 94 and radial stator vents 98 and exhausts the air from the open electrical package chamber 82 via the air exhaust port(s) 90.

Thus, in such embodiments, the electrical package cooling system 34 includes the air intake ports 86, the rotor 84 and/or an internal cooling fan 102 disposed in or on the rotor 84, and the air exhaust ports 90. Additionally, the air flow F generated via the electrical package cooling system 34, that is provided for cooling the electrical package 14 within the electrical package chamber 82, constitutes the primary cooling circuit of the open horizontal motor 10.

The open horizontal motor 10 additionally includes shaft bearings 22 and 24 that are disposed within respective oil sumps 106 and 108 formed within respective bearing housings 30 and 32 that are located at opposing ends of the shaft 26, within the main housing frame 18. Each oil sump 106 and 108 is filled with oil that lubricates and cools the respective bearings 22 and 24 during operation of the open horizontal motor 10. During operation, the shaft 26 and rotor 84 rotate about an axis Y of the shaft 26, relative to a fixed stator 88 of the electrical package. Accordingly, during operation, the rotation of the shaft 26, rotor 84 and cooling fan 102 about the axis Y generates the air flow F that enters, circulates through and exits the open electrical package chamber 82, thereby providing the primary cooling circuit that cools the electrical package 14.

As described above, during operation of the open horizontal motor 10 the shaft 26 and rotor 84 rotate about an axis Y. Consequently, the rotation of the shaft 26 and rotor 84 causes the bearings 22 and 24 to rotate about the axis Y at a high rate of speed, thereby generating a significant amount of heat that will damage the bearings 22 and 24, if such heat is not adequately removed. To remove such heat from the bearings 22 and 24, i.e., to cool the bearings 22 and 24, the evaporator ends 38A of the heat pipes 38 are disposed within the oil sumps 106 and 108, proximate the bearings 22 and 24, and the condenser ends 38B of the heat pipes 38 are disposed within the primary cooling circuit, i.e., the air flow F.

More particularly, the heat pipe condenser ends 38B are disposed within the open electrical package chamber 82 adjacent the air intake port(s) 86. Therefore, prior to circulating the air flow F through the open electrical package chamber 82, as described above, the air flow F of the primary cooling circuit passes over the heat pipe condenser ends 38B. As the air flow F passes over the heat pipe condenser ends 38B, the air flow F removes heat from, i.e., cools, the heat pipe condenser ends 38B, thereby cooling the heat pipe evaporator ends 38A and subsequently, cooling the oil within the oil sumps 106 and 108 and the respective bearings 22 and 24.

Thus, during operation of the open horizontal motor 10 the heat pipe condenser ends 38B, and subsequently the bearings 22 and 24, are cooled utilizing the primary cooling circuit. And, more specifically, the heat pipe condenser ends 38B and subsequently the bearings 22 and 24, are cooled without, i.e., absent, any separate, independent auxiliary bearing cooling system, or means, that is primarily designed to cool the heat pipe condenser ends 38B. That is, the open horizontal motor 10 does not include any auxiliary, extra, additional or supplemental cooling system designed, structured and implemented to generate or provide a secondary cooling circuit for cooling the heat pipe condenser ends 38B. But rather, the open horizontal motor 10 is structured and operable to cool the heat pipe condenser ends 38B utilizing the primary cooling circuit that is designed, structured and implemented for the primary purpose of cooling the electrical package 14.

In various embodiments, the electrical package cooling system 34 of the open horizontal motor 10 further includes at least one heat exchanger 110 having the heat pipe condenser ends 38B disposed therein. More specifically, the heat exchanger(s) 110 is/are disposed within the primary cooling circuit such that the air flow F is directed across the heat exchanger(s) 110 prior to circulating through the open electrical package chamber 82. The heat exchanger(s) 110 increase(s) the removal of heat from the heat pipe condenser ends 38B and thereby increases the removal of heat from the oil within oil sumps 106 and hence, from the respective bearings 22.

Figure 4:
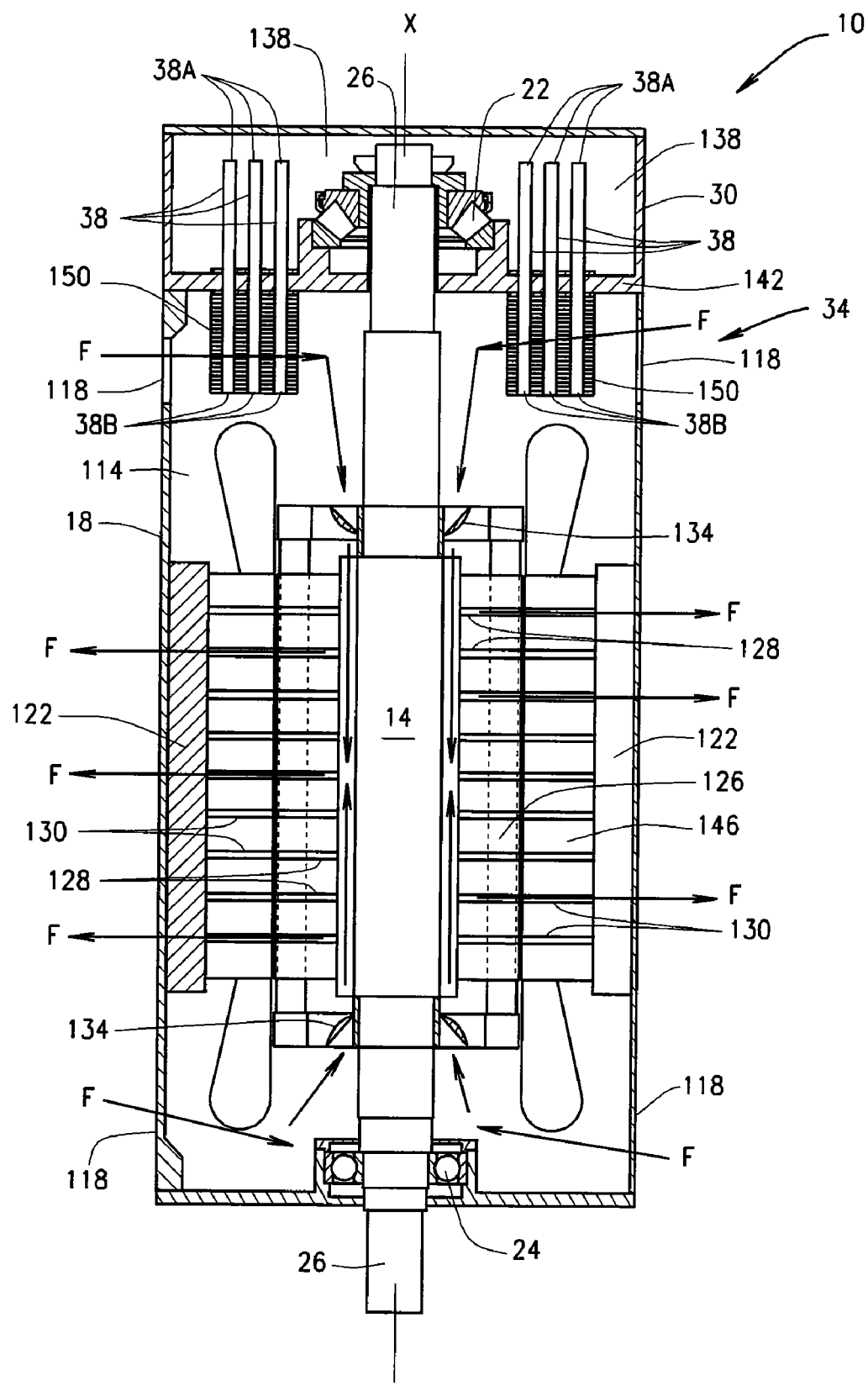
FIG. 4 is a cross-sectional side view of an exemplary high speed rotating machine, such as that shown in FIG. 1, wherein the high speed rotating machine comprises an open vertical motor, in accordance with various embodiments of the present disclosure.

Referring now to FIG. 4, in various embodiments, the machine 10 can be a high speed open vertical motor including an open electrical package chamber 114 that encloses the electrical package 14, but is open to ambient air. That is, the open vertical motor 10 includes at least one air intake port 118 that allows air from the ambient exterior environment to be drawn into the open electrical package chamber 114, and at least one air exhaust port 122 that allows the air drawn into the open electrical package chamber 114 to be exhausted back into the ambient exterior environment. More particularly, during operation of the open vertical motor 10, the rotation of a rotor 126 draws ambient air into the open electrical package chamber 114, via the air intake port(s) 118 (shown as air flow F), circulates the air flow F around the electrical package 14, vents the air through a plurality of radial rotor vents 128 and radial stator vents 130 and exhausts the air from the open electrical package chamber 114 via the air exhaust port(s) 122.

Thus, in such embodiments, the electrical package cooling system 34 includes the air intake ports 118, the rotor 126 and/or a cooling fan 134 disposed in or on the rotor 126, and the air exhaust ports 122. Additionally, the air flow F generated via the electrical package cooling system 34, that is provided for cooling the electrical package 14 within the electrical package chamber 114, constitutes the primary cooling circuit of the open vertical motor 10.

The open vertical motor 10 additionally includes shaft bearings 22 and 24, wherein bearing 22 comprises an upper antifriction shaft thrust bearing or a fluid-film bearing that requires cooling during operation of open vertical motor 10, and bearing 24 is a lower guide bearing that does not require cooling during operation of the machine 10. To cool and lubricate the bearing 22, the bearing 22 is disposed within an oil chamber 138 of the bearing housing 30 that is located at a top end of the main housing frame 18. The bearing housing 30 and oil chamber 138 are separated from the open electrical package chamber 114 by an bearing housing plate 142. The electrical package 14 generally includes a stator 146 fixedly mounted within the electrical package chamber 114 and the rotor 126 fixedly mounted to the shaft 26.

As described above, during operation of the open vertical motor 10 the shaft 26 and rotor 126 rotate about an axis X of the shaft 26, relative to fixed stator 146. Consequently, the rotation of the shaft 26 and rotor 126 cause the bearing 22 to rotate about the axis X at a high rate of speed, thereby generating a significant amount of heat that will damage the bearing 22, if such heat is not adequately removed. To remove such heat from the bearing 22, i.e., to cool the bearing 22, the evaporator ends 38A of the heat pipes 38 are disposed within the oil chamber 138, proximate the bearing 22, and the condenser ends 38B of the heat pipes 38 are disposed within the primary cooling circuit, i.e., the air flow F.

More particularly, the heat pipe condenser ends 38B are disposed within the open electrical package chamber 114 adjacent at the air intake port(s) 118. Therefore, prior to circulating the air flow F through the open electrical package chamber 114, as described above, the air flow F of the primary cooling circuit passes over the heat pipe condenser ends 38B. As the air flow F passes over the heat pipe condenser ends 38B, the air flow F removes heat from, i.e., cools, the heat pipe condenser ends 38B, thereby cooling the heat pipe evaporator ends 38A and subsequently, cooling the oil within the oil chamber 138 and hence, the respective bearing 22.

Thus, during operation of the open vertical motor 10 the heat pipe condenser ends 38B, and subsequently the bearing 22, are cooled utilizing the primary cooling circuit. And, more specifically, the heat pipe condenser ends 38B and subsequently the bearing 22, are cooled without, i.e., absent, any separate, independent auxiliary bearing cooling system, or means, that is primarily designed to cool the heat pipe condenser ends 38B. That is, the open vertical motor 10 does not include any auxiliary, extra, additional or supplemental cooling system designed, structured and implemented to generate or provide a secondary cooling circuit for cooling the heat pipe condenser ends 38B. But rather, the open vertical motor 10 is structured and operable to cool the heat pipe condenser ends 38B utilizing the primary cooling circuit that is designed, structured and implemented for the primary purpose of cooling the electrical package 14.

In various embodiments, the electrical package cooling system 34 of the open vertical motor 10 further includes at least one heat exchanger 150 having the heat pipe condenser ends 38B disposed therein. More specifically, the heat exchanger(s) 150 is/are disposed within the primary cooling circuit such that the air flow F is directed across the heat exchanger(s) 150 prior to circulating through the open electrical package chamber 114. The heat exchanger(s) 150 increase(s) the removal of heat from the heat pipe condenser ends 38B and thereby increases the removal of heat from the oil within the oil chamber 138 and hence, from the respective bearing 22.

Figure 5A:
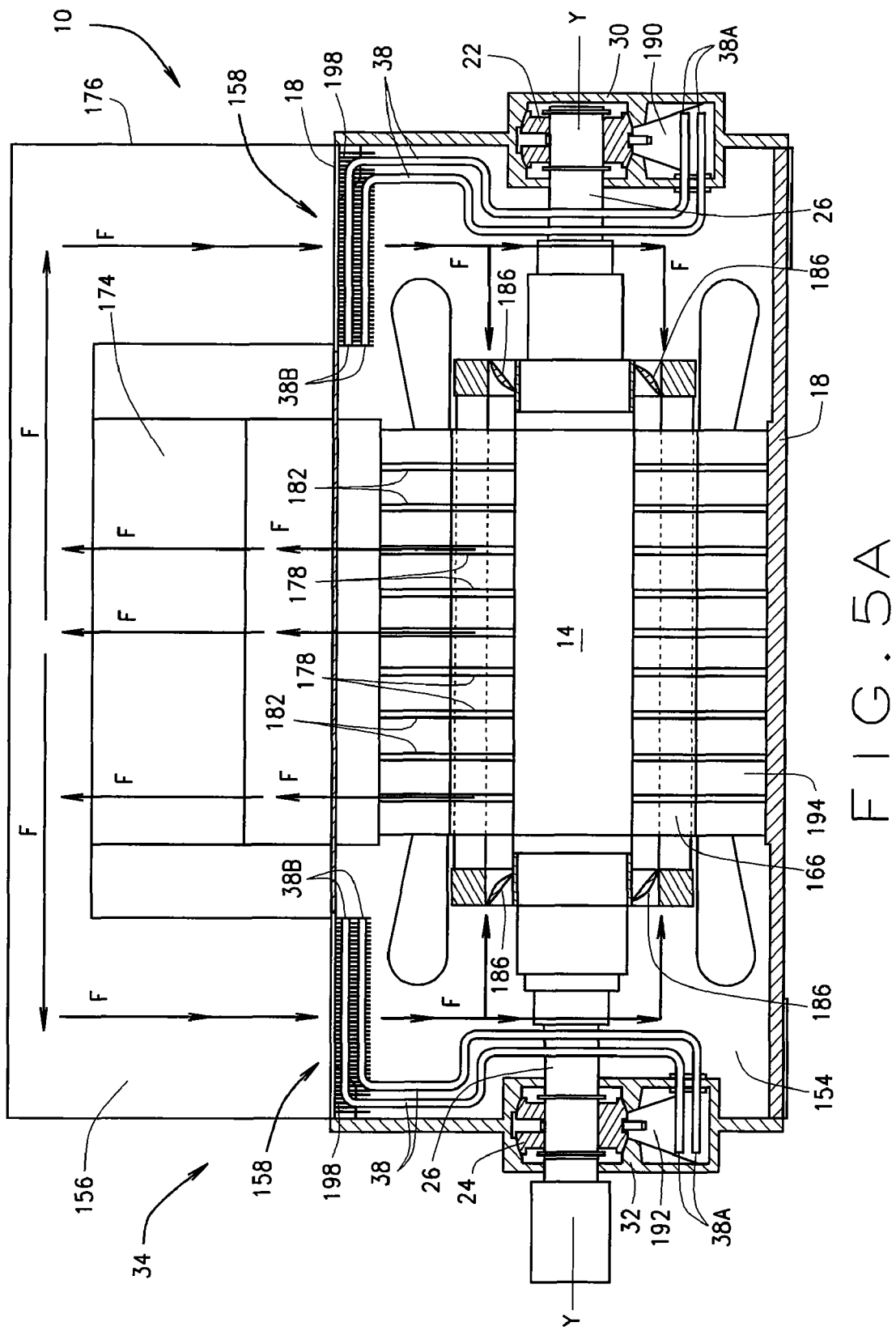
FIG. 5A is a cross-sectional side view of an exemplary high speed rotating machine, such as that shown in FIG. 1, wherein the high speed rotating machine comprises a totally enclosed water-to-air cooled (TEWAC) horizontal motor, in accordance with various embodiments of the present disclosure.
Figure 5B:
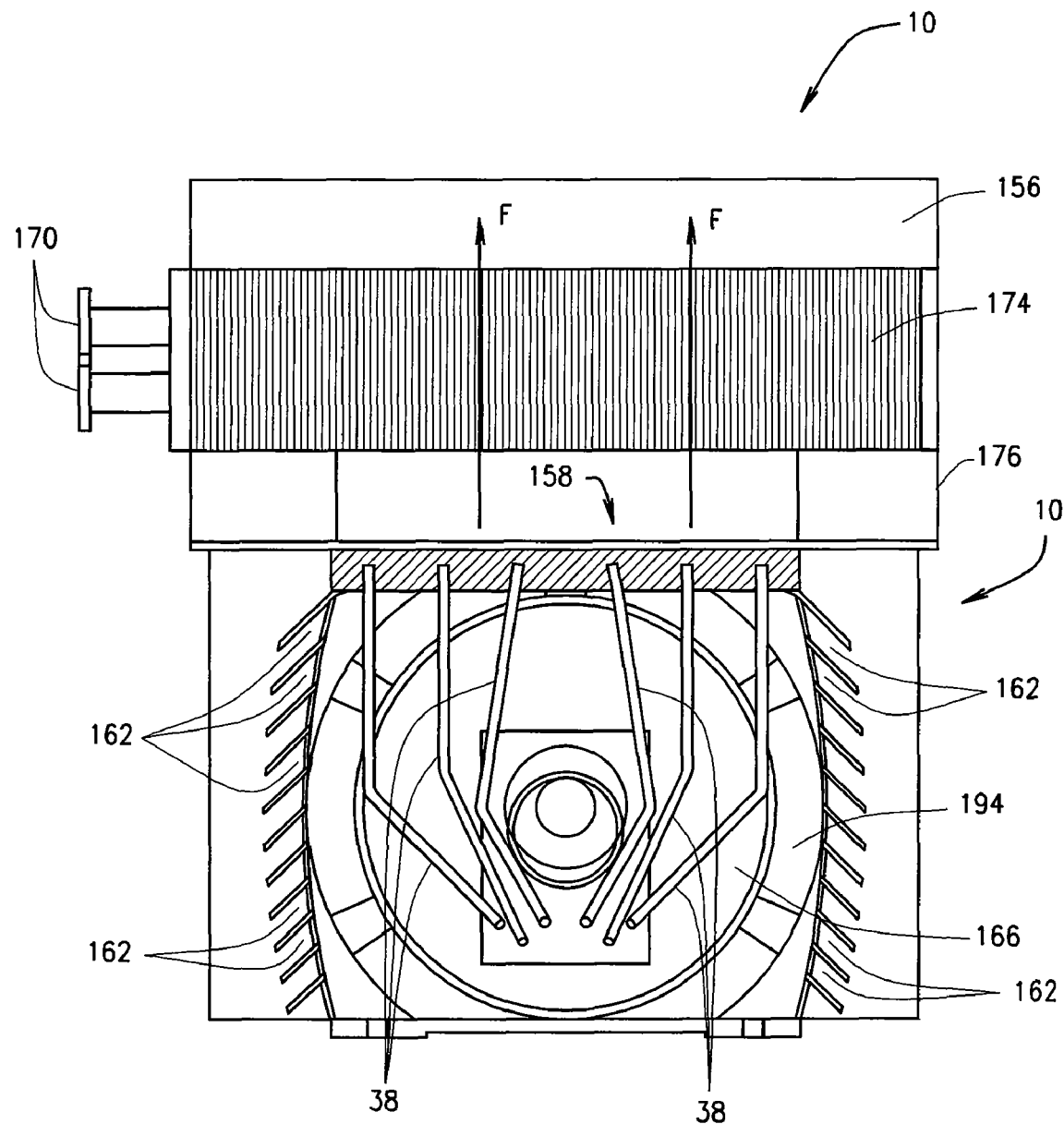
FIG. 5B is a cross-sectional front view of the exemplary high speed rotating machine shown in FIG. 5, in accordance with various embodiments of the present disclosure.

Referring now to FIGS. 5A and 5B, in various exemplary embodiments, the machine 10 can be a totally enclosed water-to-air cooled (TEWAC) motor 10, including a closed electrical package chamber 154 that totally encloses the electrical package 14. That is, there is no free exchange of air from an ambient exterior environment of the TEWAC motor 10 with an interior space of the electrical package chamber 154. The TEWAC motor 10 additionally includes a water cooled air recirculation chamber 156 mounted to a longitudinal side of the TEWAC motor main housing frame 18.

As described below, the water cooled air recirculation chamber 156 is structured and operable to cool air exhausted from the electrical package chamber 154 and re-circulate the cooled air back into the electrical package chamber 154 to cool the electrical package 14. The TEWAC motor 10 further includes at least one air intake port 158 that allows cooled air from the water cooled air recirculation chamber 156 to be drawn into the electrical package chamber 154, and at least one air exhaust port 162 that allows the air drawn into the electrical package chamber to be exhausted back into the water cooled air recirculation chamber 156. The water cooled air recirculation chamber 156 includes a plurality of the water tubes 170 disposed with a finned heat exchanger plate and chiller 174 that is disposed within a recirculation chamber housing 176. During operation of the TEWAC motor 10 water is circulated from a cooled water source (not shown), though the water tubes 170, and back to the cooled water source, thereby cooling the water tubes 170 within the finned heat exchanger plate and chiller 174.

More particularly, during operation of the TEWAC motor 10, the rotation of a rotor 166 of the electrical package 14 creates a suction within the water cooled air recirculation chamber 156 that draws cooled air from within the water cooled air recirculation chamber 156 into the electrical package chamber 154, via the air intake port(s) 158 (shown as air flow F). Rotation of the rotor 166 then circulates the air flow F through the electrical package 14 absorbing heat from, and cooling, the electrical package 14. The air flow F is then vented through a plurality of radial rotor vents 178 and radial stator vents 182 and exhausted from the electrical package chamber 154 back into the water cooled air recirculation chamber 156, via the air exhaust port(s) 162. Upon being exhausted from the electrical package chamber 154, the air flow F passes through the finned heat exchanger plate and chiller 174 and across the water chilled water tubes 170. Accordingly, the air flow F is cooled as it passes through the finned heat exchanger plate and chiller 174. The cooled air flow F is then re-circulated into and through the electrical package chamber 154, via intake port 158, as described above, to cool the electrical package 14.

Thus, in such embodiments, the electrical package cooling system 34 includes the water cooled air recirculation chamber 156, the air intake ports 158, the rotor 166 and/or a cooling fan 186 disposed in or on the rotor 166, and the air exhaust port(s) 162. Additionally, the air flow F generated via the electrical package cooling system 34, that is provided for cooling the electrical package 14 within the electrical package chamber 154, constitutes the primary cooling circuit of the TEWAC motor 10.

The TEWAC motor 10 additionally includes shaft bearings 22 and 24 that are disposed within respective oil sumps 190 and 192 formed within respective bearing housings 30 and 32 that are located at opposing ends of the shaft 26, within the main housing frame 18. Each oil sump 190 and 194 is filled with oil that lubricates and cools the respective bearings 22 and 24 during operation of the TEWAC motor 10. During operation, the shaft 26 and rotor 166 rotate about an axis Y of the shaft 26, relative to a fixed stator 194 of the electrical package 14. Accordingly, during operation, the rotation of the shaft 26, rotor 166 and cooling fan 186 about the axis Y generates the air flow F that enters from the water cooled air recirculation chamber 156, circulates through the electrical package chamber 154, is exhausted back into the water cooled air recirculation chamber 156, and circulated through the finned heat exchanger plate and chiller 174, thereby providing the primary cooling circuit that cools the electrical package 14.

As described above, during operation of the TEWAC motor 10 the shaft 26 and rotor 166 rotate about an axis Y. Consequently, the rotation of the shaft 26 and rotor 186 cause the bearings 22 and 24 to rotate about the axis Y at a high rate of speed, thereby generating a significant amount of heat that will damage the bearings 22 and 24, if such heat is not adequately removed. To remove such heat from the bearings 22 and 24, i.e., to cool the bearings 22 and 24, the evaporator ends 38A of the heat pipes 38 are disposed within the oil sumps 190 and 192, proximate the bearings 22, and the condenser ends 38B of the heat pipes 38 are disposed within the primary cooling circuit, i.e., the air flow F.

More particularly, the heat pipe condenser ends 38B are disposed within the electrical package chamber 154 adjacent the air intake port(s) 158. Therefore, prior to re-circulating the primary air flow F through the electrical package chamber 154, as described above, the air flow F of the primary cooling circuit passes over the heat pipe condenser ends 38B. As the air flow F passes over the heat pipe condenser ends 38B, the air flow F removes heat from, i.e., cools, the heat pipe condenser ends 38B, thereby cooling the heat pipe evaporator ends 38A and subsequently, cooling the oil within the oil sumps 190 and 192 and hence, the respective bearings 22 and 24.

Thus, during operation of the TEWAC motor 10 the heat pipe condenser ends 38B, and subsequently the bearings 22 and 24, are cooled utilizing the primary cooling circuit. And, more specifically, the heat pipe condenser ends 38B and subsequently the bearings 22, are cooled without, i.e., absent, any separate, independent auxiliary bearing cooling system, or means, that is primarily designed to cool the heat pipe condenser ends 38B. That is, the TEWAC motor 10 does not include any auxiliary, extra, additional or supplemental cooling system designed, structured and implemented to generate or provide a secondary cooling circuit for cooling the heat pipe condenser ends 38B. But rather, the TEWAC motor 10 is structured and operable to cool the heat pipe condenser ends 38B utilizing the primary cooling circuit that is designed, structured and implemented for the primary purpose of cooling the electrical package 14.

In various embodiments, the electrical package cooling system 34 of the TEWAC motor 10 further includes at least one heat exchanger 198 having the heat pipe condenser ends 38B disposed therein. More specifically, the heat exchanger(s) 198 is/are disposed within the primary cooling circuit such that the air flow F is directed across the heat exchanger(s) 198 prior to circulating through the electrical package chamber 154 and water cooled air recirculation chamber 156. The heat exchanger(s) 198 increase the removal of heat from the heat pipe condenser ends 38B and thereby increase the removal of heat from the oil within oil sumps 190 and hence, from the respective bearings 22 and 24.

Referring now to FIGS. 6A and 6B, although the various embodiments have been described herein as having the evaporator ends 38A of the heat pipes 38 proximate, e.g., near, close to, adjacent, touching, etc., it is envisioned that the evaporator ends could also be disposed within a bearing journal 202 of each respective shaft bearing 22 and/or 24. For example, as illustrated in FIG. 6A, the evaporator end 38A of one or more heat pipes 38 can be disposed within the bearing journal 202 and/or the oil sump 106 of an open horizontal motor 10, such as that shown in FIGS. 3A and 3B. Or, as exemplarily illustrated in FIG. 6B, the evaporator end 38A of one or more heat pipes 38 can be integrally disposed within the structure 203 of the bearing housing 30 of a vertical open motor 10 in close proximity to the respective bearing 22/24, such as that shown in FIG. 4. Similarly, the evaporator end 38A of one or more heat pipes 38 can be disposed within the bearing journal of any other high speed rotating machine 10 such at those exemplarily illustrated in FIGS. 2, 5A and 5B.

Figure 7:
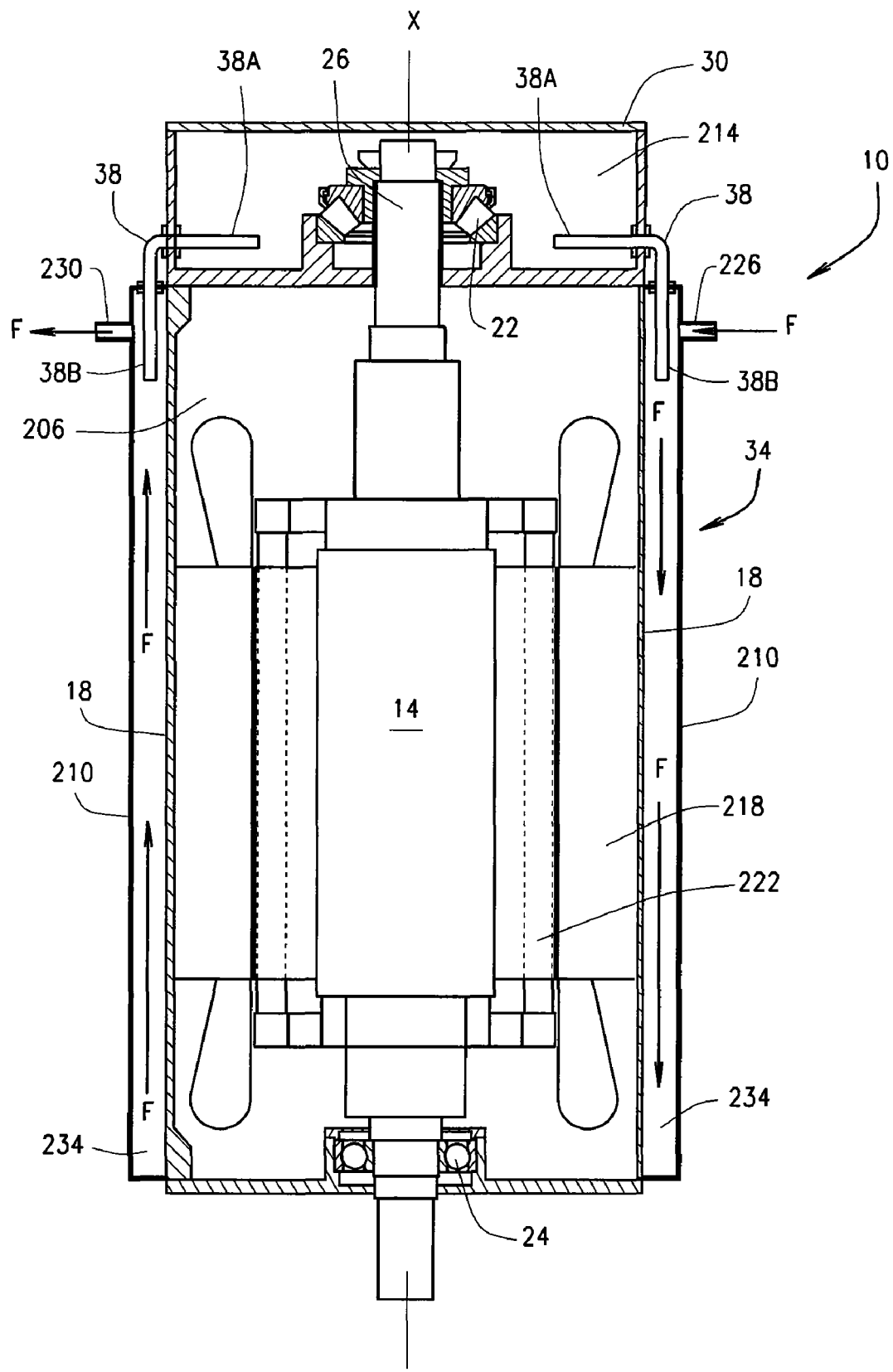
FIG. 7 is a cross-sectional side view of an exemplary high speed rotating machine, such as that shown in FIG. 1, wherein the high speed rotating machine comprises a totally enclosed water cooled (TEWC) vertical motor, in accordance with various embodiments of the present disclosure.

Referring now to FIG. 7, in various other exemplary embodiments, the machine 10 can be a totally enclosed water cooled (TEWC) motor 10, including a closed electrical package chamber 206 that totally encloses the electrical package 14. That is, there is no free exchange of air from an ambient exterior environment of the TEWC motor 10 with an interior space of the electrical package chamber 206. In such embodiments, the electrical package cooling system 34 comprises a water jacket 210 that surrounds the frame 18.

The TEWC motor 10 additionally includes shaft bearings 22 and 24, wherein bearing 22 comprises an upper antifriction shaft thrust bearing or a fluid-film bearing that requires cooling during operation of the TEWC motor 10, and bearing 24 is a lower guide bearing that does not require cooling during operation of the machine 10. To cool and lubricate the bearing 22, the bearing 22 is disposed within an oil chamber 214 of the bearing housing 30 that is located at a top end of the main housing frame 18.

The electrical package 14 generally includes a stator 218 fixedly mounted within the electrical package chamber 206 and a rotor 222 fixedly mounted to the shaft 26. During operation of the TEWC motor 10 the shaft 26 and rotor 222 rotate about an axis X of the shaft 26, relative to the fixed stator 218.

As described above, the electrical package cooling system 34 of the TEWC motor 10 comprises the water jacket 210. The water jacket 210 includes a coolant inlet 226 and a coolant outlet 230 that respectively provide an ingress and egress for a coolant, e.g., water or other suitable liquid or gaseous coolant, to be circulated through the water jacket 210, illustrated as coolant flow F. The coolant flow F constitutes the primary cooling circuit of the TEWC motor 10 provided for cooling the electrical package 14 within the electrical package chamber 206.

More particularly, the coolant flows through the water jacket 210 thereby cooling the frame 18. The cooled frame 18 extracts heat from the electrical package chamber 206 and hence, from the electrical package 14. In various embodiments, the coolant is routed through channels 234 in a controlled way such that coolant cools the entire frame 18 with only one coolant inlet 226 and one coolant outlet 230. Alternatively, in various other embodiments, the coolant can be routed through channels 234 in a controlled way utilizing one or more coolant inlets 226 and one or more coolant outlets 230. As described above, the primary cooling circuit, i.e., the coolant flow F, is generated by the electrical package cooling system 34, i.e., the water jacket 210, primarily to cool the electrical package 14.

As also described above, during operation of the TEWC motor 10 the shaft 26 and rotor 222 rotate about an axis X. Consequently, the rotation of the shaft 26 and rotor 22 cause the bearing 22 to rotate about the axis X at a high rate of speed, thereby generating a significant amount of heat that will damage the bearing 22, if such heat is not adequately removed. To remove such heat from the bearing 22, i.e., to cool the bearing 22, the evaporator ends 38A of the heat pipes 38 are disposed within the oil chamber 214, proximate the bearing 22, and the condenser ends 38B of the heat pipes 38 are disposed within the primary cooling circuit, more particularly, within the water jacket 210 the coolant flow F. Therefore, as the coolant flow F circulates through the channels 34 around the exterior of the TEWC motor housing 18, the coolant flow F of the primary cooling circuit passes over the heat pipe condenser ends 38B. As the coolant flow F passes over the heat pipe condenser ends 38B, the coolant flow F extracts heat from, i.e., cools, the heat pipe condenser ends 38B, thereby cooling the heat pipe evaporator ends 38A and subsequently, cooling the oil within the oil chamber 214 and hence, the bearing 22.

Thus, during operation of the TEWC motor 10 the heat pipe condenser ends 38B, and subsequently the bearing 22, are cooled utilizing the primary cooling circuit. And, more specifically, the heat pipe condenser ends 38B and subsequently the bearing 22, are cooled without, i.e., absent, any separate, independent auxiliary bearing cooling system, or means, that is primarily designed to cool the heat pipe condenser ends 38B. That is, the TEWC motor 10 does not include any auxiliary, extra, additional or supplemental cooling system designed, structured and implemented to generate or provide a secondary cooling circuit for cooling the heat pipe condenser ends 38B. But rather, the TEWC motor 10 is structured and operable to cool the heat pipe condenser ends 38B utilizing the primary cooling circuit that is designed, structured and implemented for the primary purpose of cooling the electrical package 14.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method of cooling shaft bearings of a high speed rotating machine, said method comprising utilizing a primary cooling circuit of the machine that is structured and operable to cool a drive package of the machine to cool condenser ends of each of a plurality of independent heat pipes absent an auxiliary cooling system structured for cooling the heat pipe condenser ends, each heat pipe operable in any orientation and disposed completely within an outer body of the high speed rotating machine having the respective condenser end disposed within the primary cooling circuit and a respective evaporator end disposed within a component of a bearing housing of a shaft bearing of the high speed rotating machine that is in thermally conductive contact with the shaft bearing such that heat generated by the bearing during operation of the machine and transferred to the bearing housing component is absorbed from the component at the heat pipe evaporator ends and removed from the component via the heat pipe condenser ends that are cooled using the primary cooling circuit, thereby cooling the component and in turn cooling the shaft bearing.

2. The method of claim 1, wherein the machine comprises a totally enclosed fan cooled (TEFC) vertical motor, the drive package comprises a motor electrical package and the primary cooling circuit comprises an air flow generated by a cooling fan of a TEFC vertical motor that is directed along an exterior of the TEFC vertical motor to cool the TEFC vertical motor and enclosed electrical package, and wherein utilizing the primary cooling circuit of the machine to cool the condenser ends the heat pipes absent an auxiliary cooling system for cooling the heat pipe condenser ends comprises directing the air flow across the heat pipe condenser ends prior to directing the air flow along the exterior of the TEFC vertical motor.

3. The method of claim 2, wherein directing the air flow across the heat pipe condenser ends prior to directing the air flow along the exterior of the TEFC vertical motor comprises directing the air flow through at least one heat exchanger having the heat pipe condenser ends disposed therein prior to directing the air flow along the exterior of the TEFC vertical motor.

4. The method of claim 1, wherein the machine comprises an open horizontal motor, the drive package comprises a motor electrical package and the primary cooling circuit comprises an air flow generated by rotation of a rotor of the electrical package that is directed though an interior of the open horizontal motor and across the electrical package to cool the electrical package, and wherein utilizing the primary cooling circuit of the machine to cool the condenser ends the heat pipes absent an auxiliary cooling system for cooling the heat pipe condenser ends comprises directing the air flow across the heat pipe condenser ends prior to directing the air flow across the electrical package.

5. The method of claim 4, wherein directing the air flow across the heat pipe condenser ends prior to directing the air flow across the electrical package comprises directing the air flow through at least one heat exchanger having the heat pipe condenser ends disposed therein prior to directing the air flow across the electrical package.

6. The method of claim 1, wherein the machine comprises a motor and a totally enclosed water-to-air cooled motor, the drive package comprises a motor electrical package and the primary cooling circuit a recirculation flow of air generated by rotation of a rotor of the electrical package that is circulated through a water cooled air recirculation chamber and an electrical package chamber in which the electrical package is disposed to cool the electrical package, and wherein utilizing the primary cooling circuit of the machine to cool the condenser ends the heat pipes absent an auxiliary cooling system for cooling the heat pipe condenser ends comprises directing the air flow cooled by the water cooled air recirculation chamber across the heat pipe condenser ends prior to circulating the cooled air flow through the electrical package chamber.

7. A method of cooling shaft bearings of a high speed rotating machine, said method comprising:
  disposing each of a plurality of independent heat pipes completely within an outer body of the high speed rotating machine;
  disposing an evaporator end of each heat pipe within a component of a bearing housing of a shaft bearing of the high speed rotating machine that is in thermally conductive contact with the shaft bearing such that heat generated by the bearings during operation of the machine and transferred to the bearing housing component is absorbed from the bearing housing component via the heat pipe evaporator ends; and
  disposing a respective condenser end of each heat pipe within a primary cooling circuit of the machine such that the heat absorbed from the bearing housing component at the heat pipe evaporator ends is removed from the heat pipes at the condenser ends utilizing the primary cooling circuit absent an auxiliary cooling system structured for cooling the heat pipe condenser ends, thereby cooling the bearing housing component and subsequently cooling the shaft bearing regardless of the orientation of the high speed rotating machine, the primary cooling circuit structured and operable to cool a drive package of the machine such that during operation of the machine.

8. The method of claim 7, wherein the machine comprises a totally enclosed fan cooled (TEFC) vertical motor, the drive package comprises a motor electrical package and the primary cooling circuit comprises an air flow generated by a cooling fan of a TEFC vertical motor and directed along an exterior of the TEFC vertical motor to cool the TEFC vertical motor and enclosed electrical package, and wherein disposing the condenser ends of the heat pipes within the primary cooling circuit of the machine such that the heat pipe condenser ends are cooled absent an auxiliary cooling system for cooling the heat pipe condenser end comprises disposing the condenser ends of the heat pipes within the air flow such that the air flow is directed across the heat pipe condenser ends prior to being directed along the exterior of the TEFC vertical motor.

9. The method of claim 8, wherein disposing the condenser ends of the heat pipes within the air flow such that the air flow is directed across the heat pipe condenser ends prior to being directed along the exterior of the TEFC vertical motor comprises:
  disposing the heat pipe condenser ends within at least one heat exchanger; and
  disposing the at least one heat exchanger within the air flow such that the air flow is directed across the at least one heat exchanger prior to being directed along the exterior of the TEFC vertical motor.

10. The method of claim 7, wherein the machine comprises an open horizontal motor, the drive package comprises a motor electrical package and the primary cooling circuit comprises an air flow generated by rotation of a rotor of the electrical package that is directed though an interior of the open horizontal motor and across the electrical package to cool the electrical package, and wherein disposing the condenser ends of the heat pipes within the primary cooling circuit of the machine such that the heat pipe condenser ends are cooled absent an auxiliary cooling system for cooling the heat pipe condenser ends comprises disposing the condenser ends of the heat pipes within the air flow such that the air flow is directed across the heat pipe condenser ends prior to directing the air flow across the electrical package.

11. The method of claim 10, wherein disposing the condenser ends of the heat pipes within the air flow such that the air flow is directed across the heat pipe condenser ends prior to directing the air flow across the electrical package comprises:
  disposing the heat pipe condenser ends within at least one heat exchanger; and
  disposing the at least one heat exchanger within the air flow such that the air flow is directed across the at least one heat exchanger prior to being directed across the electrical package.

12. The method of claim 7, wherein the machine comprises a totally enclosed water-to-air cooled motor, the drive package comprises a motor electrical package and the primary cooling circuit a recirculation flow of air generated by rotation of a rotor of the electrical package that is circulated through a water cooled air recirculation chamber to cool the air flow and an electrical package chamber in which the electrical package is disposed to cool the electrical package, and wherein disposing the condenser ends of the heat pipes within the primary cooling circuit of the machine such that the heat pipe condenser ends are cooled absent an auxiliary cooling system for cooling the heat pipe condenser ends comprises disposing the heat pipe condenser ends proximate the circulation path of the air such that the air cooled by the water cooled air recirculation chamber cools the heat pipe condenser ends prior to cooling the electrical package.

13. The method of claim 7, wherein disposing the evaporator ends of the heat pipes within a component of the bearing housing of the shaft bearing that is in thermally conductive contact with the shaft bearing comprises disposing the evaporator end of at least one of the heat pipes within an oil sump or an oil chamber of a bearing housing of the shaft bearing such that heat generated by the bearing during operation of the machine and transferred to oil within the oil sump or oil chamber and is absorbed from the oil at the heat pipe evaporator ends and removed from the oil via the heat pipe condenser ends that are cooled using the primary cooling circuit, thereby cooling the oil and subsequently the shaft bearing.

14. The method of claim 7, wherein disposing the evaporator ends of the heat pipes within a component of the bearing housing of the shaft bearing that is in thermally conductive contact with the shaft bearing comprises disposing the evaporator end of at least one of the heat pipes within a bearing journal of the shaft bearing such that heat generated by the bearing during operation of the machine and transferred to the journal is absorbed from the journal at the heat pipe evaporator ends and removed from the journal via the heat pipe condenser ends that are cooled using the primary cooling circuit, thereby cooling the journal and subsequently the shaft bearing.

15. The method of claim 7, wherein the shaft bearings comprise thrust fluid film bearings and wherein disposing the evaporator ends of the heat pipes within a component of the bearing housing of the shaft bearing that is in thermally conductive contact with the shaft bearing comprises disposing the evaporator end of at least one of the heat pipes within a bearing shoe of each bearing such that heat generated by the bearing during operation of the machine and transferred to the bearing shoe is absorbed from the bearing shoe at the heat pipe evaporator ends and removed from the bearing shoe via the heat pipe condenser ends that are cooled using the primary cooling circuit, thereby cooling the bearing shoe and subsequently the shaft bearing.

16. A high speed rotating machine comprising:
a main housing frame;
a drive package rotationally disposed within the frame via a shaft mounted within at least one shaft bearing mounted within a respective bearing housing coupled to the frame;
a drive package cooling system structured and operable to provide a primary cooling circuit designed to cool the drive package during operation of the machine; and
a plurality of independent heat pipes, each heat pipe having an evaporator end and an opposing condenser end, wherein each heat pipe evaporator end is disposed within a component of the respective bearing housing of one of the shaft bearings in thermally conductive contact with the respective shaft bearing to absorb heat generated by the respective shaft bearing during operation of the machine and transferred to the respective bearing housing component, and wherein each heat pipe condenser end is disposed within the primary cooling circuit of the machine such that the heat absorbed from the respective bearing housing component at the respective heat pipe evaporator ends is removed from the heat pipes at the condenser ends utilizing the primary cooling circuit absent an auxiliary cooling system structured for cooling the heat pipe condenser ends, thereby cooling the respective bearing housing component and subsequently cooling the respective shaft bearing regardless of the orientation of the high speed rotating machine.

17. The machine of claim 16, wherein the machine comprises a totally enclosed fan cooled (TEFC) vertical motor, the drive package comprises a motor electrical package and the primary cooling circuit comprises an air flow generated by a cooling fan of a TEFC vertical motor and directed along an exterior of the TEFC vertical motor frame to cool the TEFC vertical motor and enclosed electrical package, and wherein the heat pipe condenser ends are disposed within the air flow such that the air flow is directed across the heat pipe condenser ends prior to being directed along the exterior of the TEFC vertical motor, thereby cooling the heat pipe condenser ends absent an auxiliary cooling system for cooling the heat pipe condenser end.

18. The machine of claim 17 further comprising at least one heat exchanger having the heat pipe condenser ends disposed therein, wherein the at least one heat exchanger is disposed within the air flow such that the air flow is directed across the at least one heat exchanger prior to being directed along the exterior of the TEFC vertical motor.

19. The machine of claim 16, wherein the machine comprises an open horizontal motor, the drive package comprises a motor electrical package and the primary cooling circuit comprises an air flow generated by rotation of a rotor of the electrical package that is directed though an interior of the open horizontal motor and across the electrical package to cool the electrical package, and wherein the heat pipe condenser ends are disposed within the air flow such that the air flow is directed across the heat pipe condenser ends prior to directing the air flow across the electrical package, thereby cooling the heat pipe condenser ends absent an auxiliary cooling system for cooling the heat pipe condenser end.

20. The machine of claim 19 further comprising at least one heat exchanger having the heat pipe condenser ends disposed therein, wherein the at least one heat exchanger is disposed within the air flow such that the air flow is directed across the at least one heat exchanger prior to being directed across the electrical package.

21. The machine of claim 16, wherein the machine comprises a totally enclosed water-to-air cooled motor, the drive package comprises a motor electrical package and the primary cooling circuit a recirculation flow of air generated by rotation of a rotor of the electrical package that is circulated through a water cooled air recirculation chamber to cool the air flow and an electrical package chamber in which the electrical package is disposed to cool the electrical package, and wherein the heat pipe condenser ends are disposed within the primary cooling circuit of the machine such that the heat pipe condenser ends are cooled absent an auxiliary cooling system for cooling the heat pipe condenser end comprises disposing the heat pipe condenser ends proximate the circulation path of the air such that the air cooled by the water cooled air recirculation chamber cools the heat pipe condenser ends prior to cooling the electrical package.

22. The machine of claim 16, wherein the component of the respective bearing housing that is in thermally conductive contact with the respective shaft bearing comprises an oil sump or an oil chamber having bearing cooling oil disposed therein, and wherein the evaporator ends of the respective heat pipes are disposed within the oil sump or oil chamber such that heat generated by the bearing during operation of the machine and transferred to the oil within the oil SUMP or oil chamber is absorbed from the oil at the heat pipe evaporator ends and removed from the oil via the heat pipe condenser ends that are cooled using the primary cooling circuit, thereby cooling the oil and subsequently the shaft bearing.

23. The machine of claim 16, wherein the component of the respective bearing housing that is in thermally conductive contact with the respective shaft bearing comprises a bearing journal of the respective shaft bearing, and wherein the evaporator ends of the respective heat pipes are disposed within the respective bearing journal such that heat generated by the bearing during operation of the machine and transferred to the respective journal is absorbed from the respective journal at the respective heat pipe evaporator ends and removed from the respective journal via the respective heat pipe condenser ends that are cooled using the primary cooling circuit, thereby cooling the respective journal and subsequently the respective shaft bearing.

24. The machine of claim 16, wherein the at least one shaft bearing comprises at least one thrust fluid film bearing and wherein the component of the respective bearing housing that is in thermally conductive contact with the respective shaft bearing comprises a bearing shoe of the respective bearing, and wherein the evaporator ends of the respective heat pipes are disposed within the respective bearing shoe such that heat generated by the bearing during operation of the machine and transferred to the respective bearing shoe is absorbed from the respective bearing shoe at the respective heat pipe evaporator ends and removed from the respective bearing shoe via the respective heat pipe condenser ends that are cooled using the primary cooling circuit, thereby cooling the respective bearing shoe and subsequently the respective bearing.

* * * * *